UNITED STATES PATENT OFFICE.

LIDURANIA HETFIELD, OF DETROIT, MICHIGAN.

IMPROVEMENT IN MEDICAL COMPOUNDS OR LINIMENTS.

Specification forming part of Letters Patent No. 157,329, dated December 1, 1874; application filed May 28, 1874.

*To all whom it may concern:*

Be it known that I, LIDURANIA HETFIELD, of Detroit, in the county of Wayne and State of Michigan, have invented certain new and useful Improvements in Medical Compound, called "Medical Cream Liniment;" and I do hereby declare that the following is a full, clear, and exact description thereof, which will enable others skilled in the art to which it pertains to make and use the same.

My invention relates to that class of medical compounds used for the alleviation of pain and cure of rheumatism and kindred diseases; and consists in mixing hen's eggs, vinegar, whisky, turpentine, hartshorn, camphor, and saltpeter in the proportions hereinafter set forth.

In preparing my medical cream liniment, I take the yolks of four (4) hen's eggs, and beat them well together; to this I add one (1) gill good cider-vinegar, one-half (½) pint best whisky, one-half pint turpentine, twenty-eight (28) grains hartshorn, fourteen (14) grains gum-camphor, and eight (8) grains of saltpeter. As each ingredient is added this mixture should be well shaken.

The liniment is applied to the parts affected in the usual manner.

Having described my invention, what I claim, and desire to secure by Letters Patent, is—

A liniment composed of the ingredients above enumerated, called "medical cream liniment," mixed and compounded in about the proportions and manner specified; and for the purpose stated.

In testimony that I claim the foregoing as my own I affix my signature in presence of two witnesses.

LIDURANIA HETFIELD.

Witnesses:
 JAMES T. McCLELLAN,
 DANIEL W. BROOKS.